Aug. 29, 1961 W. M. WATKINS 2,998,270
FLEXIBLE PIPE COUPLING FOR USE IN A HIGH PRESSURE, HIGH
TEMPERATURE PNEUMATIC DUCTING SYSTEM
Filed Feb. 25, 1957 4 Sheets-Sheet 1

INVENTOR.
WILLIAM MACK WATKINS
BY
George C. Sullivan
Agent

Aug. 29, 1961 W. M. WATKINS 2,998,270
FLEXIBLE PIPE COUPLING FOR USE IN A HIGH PRESSURE, HIGH
TEMPERATURE PNEUMATIC DUCTING SYSTEM
Filed Feb. 25, 1957 4 Sheets-Sheet 3

INVENTOR.
WILLIAM MACK WATKINS
BY
George C. Sullivan
Agent

INVENTOR.
WILLIAM MACK WATKINS
BY
Agent

United States Patent Office 2,998,270
Patented Aug. 29, 1961

2,998,270
FLEXIBLE PIPE COUPLING FOR USE IN A HIGH PRESSURE, HIGH TEMPERATURE PNEUMATIC DUCTING SYSTEM
William Mack Watkins, Canoga Park, Calif., assignor to Lockheed Aircraft Corporation, Burbank, Calif.
Filed Feb. 25, 1957, Ser. No. 642,015
1 Claim. (Cl. 285—265)

This invention relates to joints and couplings and, more particularly, to thermal resistance joints for facilitating thermal expansions and mechanical motions in high temperature pneumatic systems and the like.

In the aircraft industry, as well as other industries, ducting systems are employed for carrying a heated substance under pressure. For example, compressed air bled from turbo-propulsive engines is under high pressure and reaches a temperature of 800° or higher. It has been a problem to provide a suitable joint for use in such a ducting system which affords an efficient and dependable means of sealing which is not subject to fatigue or wear failures under conditions of angular or longitudinal movement at high temperatures and/or high pressures.

In the past, metal bands have been constricted around the joint to effect coupling but this has proven to be inflexible due to the friction present between parts and furthermore the metal bands provide poor coupling due to the inefficient sealing. Another conventional joint employs a simple expandable bellows in the ducting system for absorbing mechanical deflections and thermal expansion. This means has proven ineffective due to the fact that the absence of internal support requires that some external support be added to prevent the flexible bellows from expanding laterally when high pressure is applied. Using external lateral supports is undesirable because of added weight and bulkiness. Generally, any deflections of the bellows induces high stresses which often result in rupturing the joint or if continued over a period of time produces fatigue failure. Furthermore, high velocity internal air flows tend to vibrate the bellows which often causes fatigue failures. Bellows systems have no means for allowing rotation of the connected tube about its axis.

Because of the necessity of high sealing efficiency and flexibility, it has been found desirable to employ a resilient sealing means such as rings of rubber, synthetic rubber, plastic seals, and the like, compressed between the joint and ducts or tubes. The use of this type of seal is advantageous because in a compressed state, the seal is resilient enough to maintain effective sealing even though the longitudinal or torsional deflections are applied to the joint. But, generally, any temperatures encountered in excess of the temperature limits of the seal, render the seal's use impractical.

These difficulties are overcome in a device disclosed in my co-pending application filed on August 5, 1955, entitled High Temperature Joint, Serial No. 526,726, and now Patent No. 2,937,036, issued May 17, 1960. However, the present invention provides an improvement over my earlier disclosed joint by disclosing a sealing means which provides static and dynamic sealing protection and further provides means for reducing the friction encountered between the joined tube sections. This joint allows for angular and rotational motions. Similar to my earlier disclosed invention, the sealing means is protected by providing a rigid and non-expandable extended heat path and thermal insulation material disposed between the sealing means and the tube sections. This earlier invention, however, relates to a joint permitting longitudinal and rotational motions.

In one embodiment of the present invention, an inner and outer race is affixed to the open end of a pair of tube sections respectively, having a ball bearing arrangement disposed between the inner and outer race. Surrounding the joint of the tube sections, there is provided a set of heat radiating members. These members are hollow in order to provide maximum surface area to atmospheric contact for efficient heat dissipation so that a large temperature drop is facilitated. Located between the sets of members is an annular synthetic rubber seal commonly referred to as an O ring mounted on a plastic seal. Inasmuch as such a seal is sometimes subject to breakdown when subjected to high temperatures, thermal insulating material may be arranged between the seals and the tube sections which, in cooperation with the members, minimizes the transfer of heat from the substance carried in the tubes to the seal.

It is to be noted that in some applications, lengthening of the heat path by means of the heat radiating members alone is adequate for protecting the seal.

It is a general object of this invention to provide a simple, practical and dependable slip joint adapted to be employed in high pressure, high temperature pneumatic ducting systems.

Another object of the present invention is to provide a means in a coupling or joint for absorbing structural angular and rotational deflections and thermal expansion of the ducting system and at the same time to possess lateral rigidity to counteract or resist lateral movement.

Another object of the present invention is to provide a flexible joint or coupling that is light in weight and does not require weighted structural means for lateral support to counteract forces exerted by the high pneumatic pressure within the ducting system.

Still a further object of the present invention is to provide a coupling with suitable resilient sealing means capable of providing efficient sealing under simultaneous dynamic and static load conditions.

Another object is to provide a ball joint which is capable of deflection when subjected to angular movements instead of solely linear movement. In this manner, the joint is capable of withstanding end loads and may be employed in tension systems.

Other objects and features of this invention will become apparent from the following detailed description as illustrated in the accompanying drawings which include:

Figure 1:
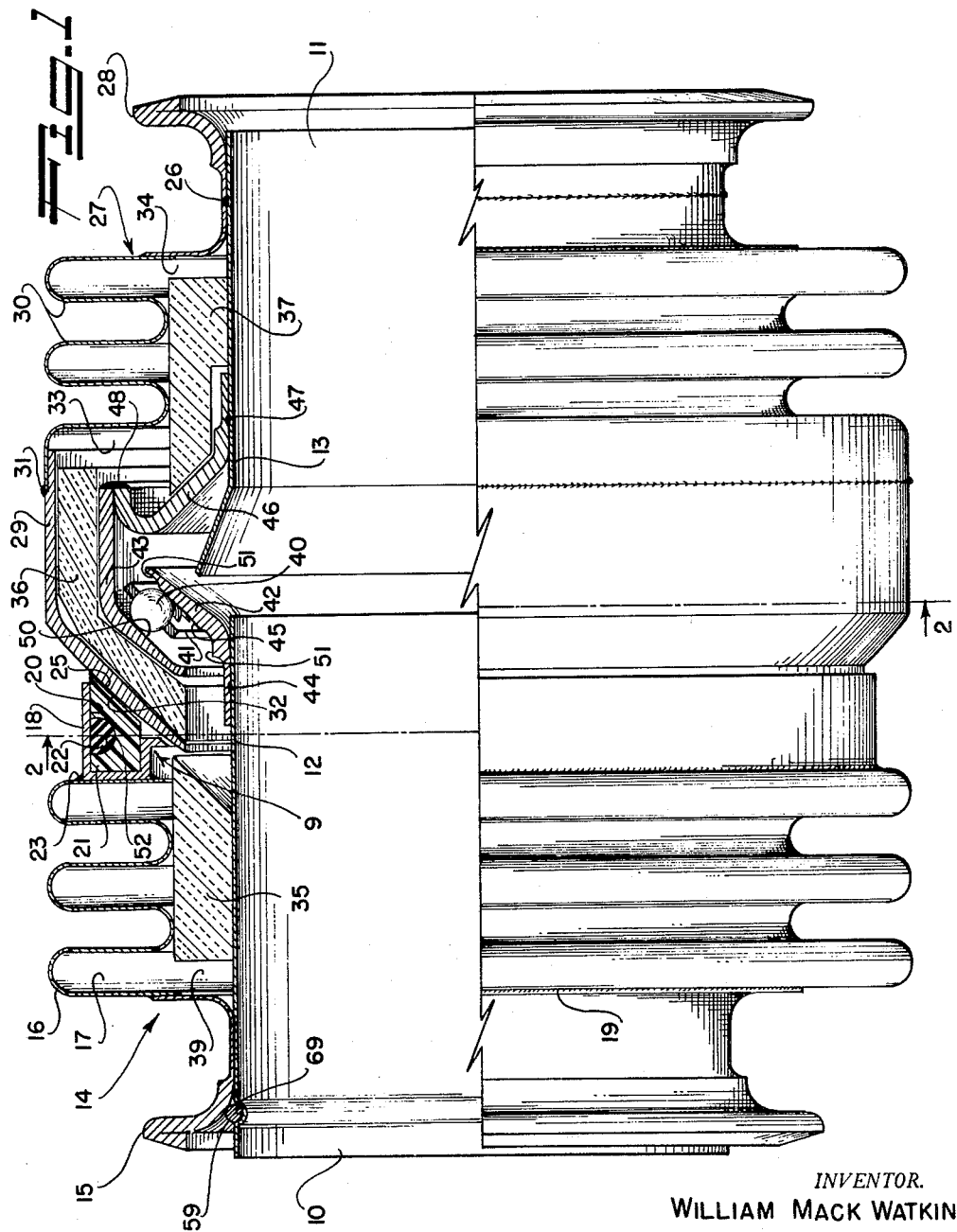
FIGURE 1 is a longitudinal detailed sectional view of a joint in accordance with the present invention.
Figure 2:
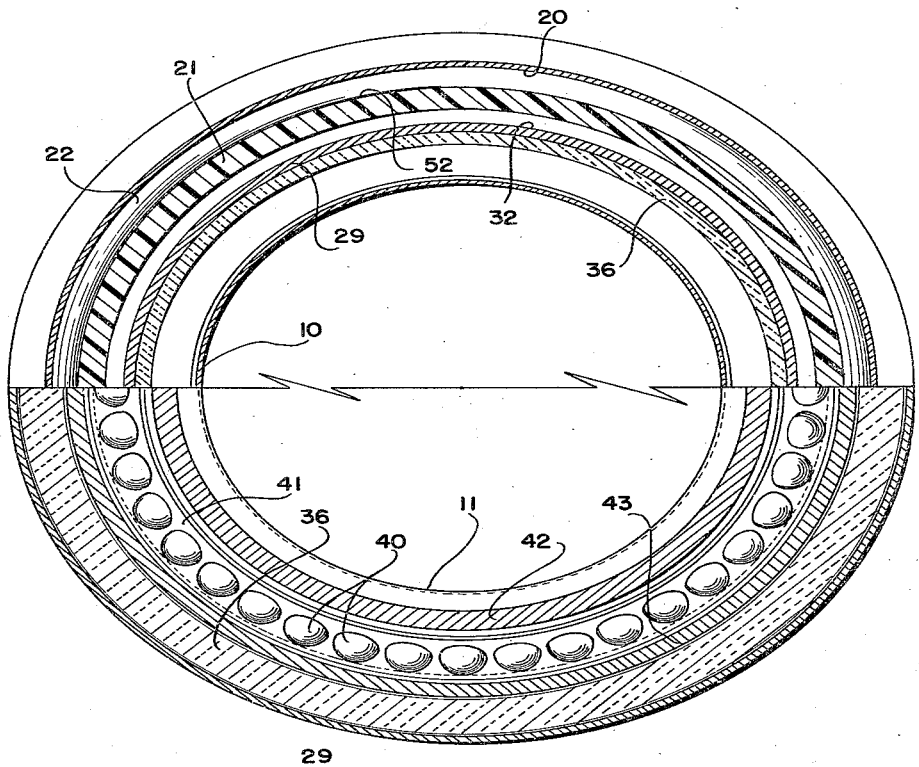
FIGURE 2 is a sectional end view taken in the direction of arrows 2—2 of FIGURE 1.

Referring to FIGURES 1 and 2 showing a joint employing the present invention, there is shown a pair of ducts or tube sections 10 and 11 arranged with their end portions 12 and 13 in axial alignment for carrying air at high pressures and high temperatures. It should be noted, however, that the joint may also be employed in other substance carrying systems. Section 10 carries an annular member 14 which extends radially outward from the tube section and then axially in space surrounding relation to end portion 12. Member 14 comprises an annular flange 15 on one end and a sealing means 9 on its opposite end separated by a plurality of rigid spaced heat radiating fins 16. The flange is secured to the fins by a weld 19. While the fins 16 are shown as extending circumferentially about end portion 12 of tube section 10, they may be constructed to extend axially or longitudinally of the joint. Each fin may be constructed to form a solid metal fin but preferably is shown having an interior space 17 which provides an extended heat path from the tube 10 to the sealing means with a smaller cross section so that a minimum of heat will be transferred to the sealing means.

The sealing means comprises an annular holder 18 having a groove 20 into which is carried a dynamic seal 21 carrying a static seal 22. The holder is attached to the heat radiating fins by welds 23. The resilient static seal is preferably circular in cross section and may be composed of silicone rubber or similar resilient material that is unaffected by the substances to be handled and that retains its characteristics of flexibility and resiliency throughout a wide range of temperatures. The resilient dynamic seal is preferably composed of materials having characteristics of low friction and low wear throughout a range of temperatures above the temperature range of the static seal. Preferably, the dynamic seal is composed of a plastic such as Teflon for example and is provided with a sealing surface 25.

Tube section 11 has secured thereto, by a seam weld 26, an annular member 27 which extends outwardly or radially from the weld and then axially to engage the sealing means carried by member 14. Annular member 27 comprises an annular flange 28 on one end and an element 29 separated from flange 28 by a plurality of rigid heat radiating fins 30. Element 29 is secured to the rigid fins by means of a weld 31 and is provided with an angular surface 32 upon which sealing surface 25 of seal 21 rides. The fins are identical to fins 16 associated with annular member 14. The longitudinal and axial extending portions of member 14 and member 27 are spaced around the end portions 12 and 13 of tubes 10 and 11 forming adjoining spaces 39, 33 and 34 which are filled with a high temperature insulating material, such as Fiberglas matting 35, 36 and 37 or solid hydrous calcium silicate.

Means are provided joining the end portions 12 and 13 of tube sections 10 and 11 for allowing angular rotational displacement of the end portions with respect to each other. These means comprise a plurality of ball bearings 40 mounted in a cage 41 movable between an inner race 42 and an outer race 43. Inner race 42 is secured to end portion 12 by means of a weld 44 and has a machined surface 45 engageable by the ball bearings. Race 43 is secured to end portion 13 of tube section 11 by means of an annular support member 46 welded to end portion 13 by weld 47 and secured to race 43 by weld 48. Race 43 is provided with a machined surface 50 engageable with the plurality of bearings 40. The plurality of bearings are movably supported between surfaces 45 and 50 and are prevented from becoming disengageable with these surfaces by a pair of stop means 51 formed on the races which cooperate to restrict the movement of the ball bearings.

In order to engage the dynamic seal 21 with surface 32 carried on element 29, a retaining ring 59 is placed into a groove 69 provided in tube section 10 adjacent flange 15 of member 14. Dynamic seal 21 is urged against this surface which is resisted by element 29 since annular member 27 is secured to tube section 11 by weld 26.

Actual operation will be described with reference to the embodiment shown in FIGURES 1 and 2 wherein the annular member 27 and outer race 43 are initially installed on end portion 13 of tube section 11 including the placement of insulating material 36 and 37 in spaces 33 and 34 respectively. This initial assembly also includes placement of the plurality of ball bearings 40 held by their cage 41 against surface 50 and the installation of inner race 42 on end portion 12 of tube section 10. Static seal 22 is fitted into groove 52 of dynamic seal 21 and the pair of seals is fitted into groove 20 provided in member 18. With the pair of seals properly positioned in groove 18 and insulating material 35 suitably positioned in space 39 provided between radiating fins 16 and end portion 12, annular member 14 may be slipped on tube section 10 to achieve engagement of angular surface 25 of the dynamic seal with angular surface 32 of the element 29. Retaining ring 59 may be inserted in the groove 69 to retain annular member 14 in position so that dynamic seal remains in engagement with surface 32 of element 29.

A slip joint constructed in this manner provides that heat transferred from the hot substance carried within the tube sections be resisted by the thermal insulating material 35, 36 and 37. Heat appearing on the tube sections is transferred or conducted via members 14 and 27 to heat radiating fins 16 and 30 respectively. Heat conducted through the fins is dissipated into the surrounding atmosphere. By employing the thermal resistance material and an extended heat path in the form of rigid radiating fins, the sealing means is adequately protected from high temperature within the tube sections 10 and 11.

Angular and rotational deflections between the tube sections 10 and 11 are permitted without allowing the escape of substance carried by the tube sections. This is accomplished by means of the resilient static seal 22 pressing against the dynamic seal 21 so that surface 25 engages surface 32 of element 29. The dynamic seal will ride up and down surface 32 of element 29 in accordance with deflections of the joint. Hot substance carried by the tube sections is prevented from escaping behind the dynamic seal 21 by the employment of static seal 22.

The joint and the spaced relationship between end portions 12 and 13 is maintained by the bearing assembly riding upon surfaces 45 and 50 of the inner and outer race in accordance with deflections of the tubes.

Figure 3:
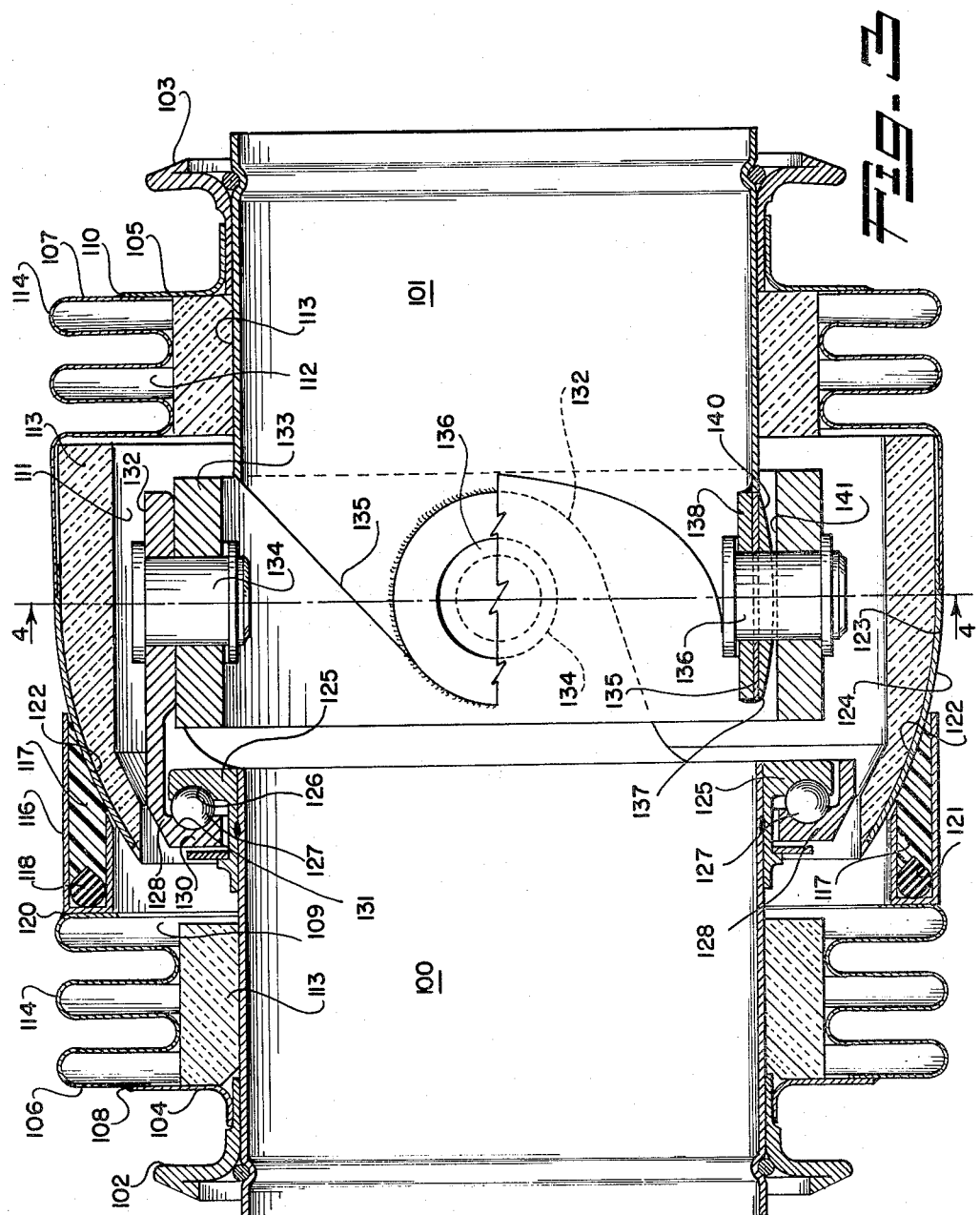
FIGURE 3 is a longitudinal detailed sectional view of another embodiment of the present invention taken in the direction of arrows 3—3 of FIGURE 4.
Figure 4:
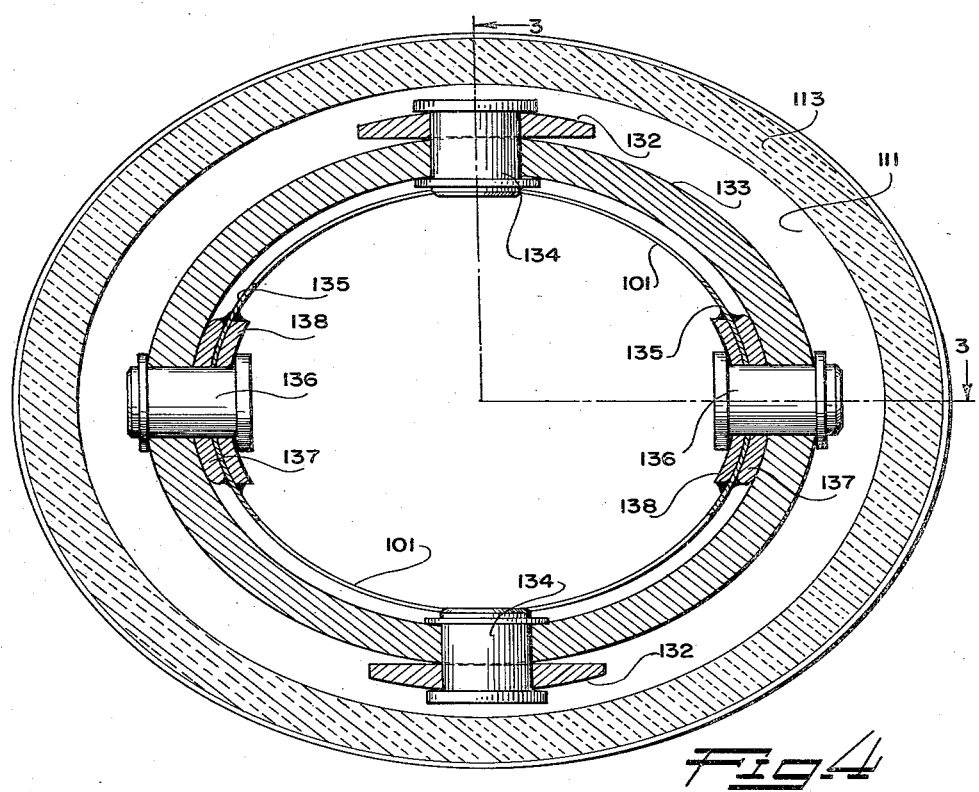
FIGURE 4 is a sectional view taken in the direction of arrows 4—4 of FIGURE 3.
Figure 5:
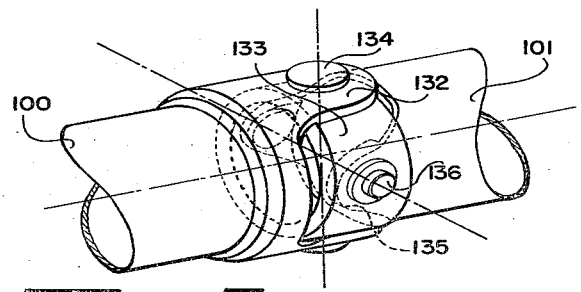
FIGURE 5 is a perspective view of a portion of the joint shown in FIGURE 4 to illustrate the gimbal relationship.

Another embodiment of the present invention as shown in FIGURES 3 and 4 is a joint which will accommodate angular and rotational movements including deflections resulting from thermal expansion without losing effective sealing and which alleviates the roller bearings from stress and strains of applied loads caused by the angular movements. As shown, a pair of tube sections 100 and 101 are arranged in axial alignment for carrying air at high pressures and high temperatures. Each tube section carries an annular flange 102 and 103 respectively and are similar in function and construction to flanges 15 and 28 associated with the embodiment shown in FIGURE 1. Coupled to the flanges 102 and 103, there are provided members 104 and 105 which carry an annular member 106 and 107 respectively. These annular members are attached to members 104 and 105 by means of welds represented by 108 and 110 respectively. The annular members extend radially outward from the welds and then project longitudinally toward one another having their major portions in spaced surrounding relation to the tube sections. A plurality of annular spaces such as spaces 109, 111 and 112 are provided which may be filled with a heat resistant material 113 similar to the material 35, 36 and 37 employed in the embodiment of FIGURES 1 and 2.

The annular members are provided with a multiplicity of spaced heat radiating fins 114 adjacent portions of the heat resistant material. The fins may take the form of corrugations spirally formed or may be a series of solid fins surrounding the mat and tube sections. The importance of the fins is to provide an extended heat path from the tube sections so that heat may be dissipated when induced from the tube sections.

A sealing means is provided which comprises an annular holder 116 carrying a dynamic seal 117 and a static seal 118. The holder is attached to heat radiating fins 114 by weld 120. The resilient static seal is preferably circular in cross section and may be composed of silicon rubber or similar resilient material that is unaffected by the substance to be handled and that retains its characteristics of flexibility and resiliency throughout a wide range of temperatures. The resilient dynamic seal is preferably composed of materials having characteristics of low friction and low wear throughout a range of temperatures above the temperature range of the static seal. The dynamic seal is provided with a notch 121 into which the static seal is received. Preferably, the dynamic seal is composed of a plastic such as Teflon for example and is provided with a sealing surface 122.

Annular member 107 has attached thereto an annular flange 123 and is provided with an angular surface 124 upon which sealing surface 122 of dynamic seal 117 rides.

The means for coupling the tube sections together may be said to comprise, generally, a ball bearing means for permitting rotational movement between the tube sections, means for permitting angular deflections between tube sections and means coupling the two aforesaid means to allow for simultaneous movements. The means for permitting rotational movement between the tube sections comprises an inner race 125 which is welded to tube section 100 and is provided with an annular groove 126 adaptable to receive a plurality of ball bearings such as bearing 127. An annular outer race 128 having a flange 130 is provided with a suitable annular groove 131 adapted to receive the plurality of ball bearings 127. However, the means for permitting angular deflections between the tube sections comprises outer race 128 having a pair of opposing integral extensions 132. Pivotally suspended between the opposing extensions 132, there is provided a gimbal ring 133 attached thereto by suitable pivots 134. Tube section 101 is provided with a pair of opposing integral mounts 135 which are movably attached to the gimbal ring by means of pivots 136. The attachment of pivots 134 and pivots 136 are located approximately 90° apart so that the gimbal ring forms a type of universal joint allowing angular deflections between tube sections 100 and 101 without placing a load on the ball bearings.

Semi-circular means 137 and member 138 are carried by the mounts 135 provide a rocking surface 140 engageable with an inner surface 141 of the gimbal ring and which provides strength and stability to the joint.

Having described only typical forms of the invention, I do not wish to be limited to the specific details herein set forth, but wish to reserve to myself any variations or modifications that may appear to those skilled in the art and fall within the scope of the following claim.

I claim:

A device of the character described for use in a ducting system carrying substance under pressure comprising, a pair of tube sections arranged in axial alignment to convey the substance, non-expandable rigid heat radiating means carried by each tube section a seal holder secured to one radiating means having a groove, a radially inwardly sloping cylindrical portion carried by the other heat radiating means, dynamic resilient sealing means circumferentially disposed about the tube sections within the groove of the holder and engageable with said cylindrical portion, static resilient sealing means carried by the dynamic sealing means and sealingly engageable with the holder, one tube section of the pair having a pair of extensions integral therewith, the other tube section carrying an annular inner race, an annular outer race axially disposed about the latter tube section, a plurality of roller bearings disposed between the inner and outer race, and a gimbal ring connecting the outer race to the extensions provided on the tube section.

References Cited in the file of this patent

UNITED STATES PATENTS

| | | |
|---|---|---|
| 996,156 | Spicer | June 27, 1911 |
| 1,425,635 | Dod | Aug. 15, 1922 |
| 1,547,482 | Woodruff | July 28, 1925 |
| 1,615,774 | Russell | Jan. 25, 1927 |
| 1,884,944 | Williams | Oct. 25, 1932 |
| 2,438,312 | Bunn | Mar. 23, 1948 |
| 2,479,104 | Dreyer | Aug. 16, 1949 |
| 2,504,166 | Tracy | Apr. 18, 1950 |
| 2,520,501 | Guiler | Aug. 29, 1950 |
| 2,712,456 | McCreery | July 5, 1955 |
| 2,846,242 | Drake | Aug. 5, 1958 |
| 2,937,036 | Watkins | May 17, 1960 |

FOREIGN PATENTS

| | | |
|---|---|---|
| 649,090 | Great Britain | Jan. 17, 1951 |